United States Patent [19]

Hirata

[11] Patent Number: 4,688,176

[45] Date of Patent: Aug. 18, 1987

[54] NAVIGATOR FOR USE ABOARD A VEHICLE

[75] Inventor: Seiichiro Hirata, Nagaokakyo, Japan

[73] Assignee: Mitsubishi Denki Kabushiki Kaisha, Tokyo, Japan

[21] Appl. No.: 725,631

[22] Filed: Apr. 22, 1985

[30] Foreign Application Priority Data

Apr. 27, 1984 [JP] Japan .................................. 59-86821

[51] Int. Cl.$^4$ ............................................. G06F 15/50
[52] U.S. Cl. .................................... 364/449; 364/561; 364/571; 73/178 R
[58] Field of Search ............... 364/424, 443, 449, 521, 364/561, 571; 73/178 R; 340/988, 995; 343/451; 342/451

[56] References Cited

U.S. PATENT DOCUMENTS

| | | | |
|---|---|---|---|
| 4,470,119 | 9/1984 | Hasebe et al. ........................ | 340/995 |
| 4,490,717 | 12/1984 | Saito ..................................... | 340/995 |
| 4,571,684 | 2/1986 | Takanabe et al. .................... | 364/424 |
| 4,593,359 | 6/1986 | Sadeh ................................... | 364/571 |

*Primary Examiner*—Gary Chin
*Attorney, Agent, or Firm*—Birch, Stewart, Kolasch & Birch

[57] ABSTRACT

A navigator for use aboard a vehicle includes means for detecting the running distance of the vehicle, means for detecting the angle of the advancing direction of the vehicle with reference to terrestrial magnetism, arithmetic operational means for calculating the coordinates of the position of the vehicle in response to the detected running distance and angle of direction, a memory for storing data regarding the coordinates of the points of correction set at intersections of roads on a map corresponding to an area in which the vehicle is traveling, the distances between the points of correction, and the angles of roads branching from the points of correction with reference to terrestrial magnetism, a locating means for judging whether the vehicle is within a predetermined distance from a point of correction by comparing the coordinates of the present position of the vehicle with the coordinates of the points of correction stored in the memory, a means for judging whether the vehicle has made a turn, and a second arithmetic operational means for calculating the ratio of a reference distance between first and second reference points of correction to the measured distance between the first and second reference points of correction from the means for detecting the running distance, to obtain a compensation coefficient in determining the actual distance traveled by the vehicle.

4 Claims, 8 Drawing Figures

F I G .2.

| Set Points | Route No. | Coordinates | Distance Data (Mode M1) | Distance Data (Mode M2) |
|---|---|---|---|---|
| | | | | |
| $P_1$ | R-1 | $(x_1, y_1)$ | | $S_{1a}$ |
| $P_a$ | R-1 | $(x_a, y_a)$ | $S_{1a}$ | $S_{a2}$ |
| $P_2$ | R-1 | $(x_2, y_2)$ | $S_{a2}$ | |
| | | | | |
| $P_b$ | R-2 | $(x_b, y_b)$ | | $S_{b1}$ |
| $P_1$ | R-2 | $(x_1, y_1)$ | $S_{b1}$ | |
| | | | | |
| | | | | |
| | | | | |
| | | | | |
| $P_d$ | R-3 | $(x_d, y_d)$ | | $S_{d2}$ |
| $P_2$ | R-3 | $(x_2, y_2)$ | $S_{d2}$ | |
| | | | | |

| Set Points | Coordinates | Branch (1) | | | Branch (2) | | | Branch (3) | | | Branch (4) | | |
|---|---|---|---|---|---|---|---|---|---|---|---|---|---|
| | | direction (1) | route No. | distance data mode | direction (2) | route No. | distance data mode | direction (3) | route No. | distance data mode | direction (4) | route No. | distance data mode |
| --- | --- | --- | --- | --- | --- | --- | --- | --- | --- | --- | --- | --- | --- |
| P1 | (x1, y1) | θ1-1 | R-2 | M1 | θ1-2 | R-1 | M1 | θ1-3 | R-2 | M2 | θ1-4 | R-1 | M2 |
| Pa | (xa, ya) | θa-4 | R-1 | M2 | θa-2 | R-1 | M1 | --- | --- | --- | --- | --- | --- |
| P2 | (x2, y2) | θ2-1 | R-3 | M1 | θ2-2 | R-1 | M1 | θ2-3 | R-3 | M2 | θ2-4 | R-1 | M2 |
| --- | --- | --- | --- | --- | --- | --- | --- | --- | --- | --- | --- | --- | --- |

42

NAVIGATOR FOR USE ABOARD A VEHICLE

FIELD OF THE INVENTION

The present invention relates to a navigator for use aboard a vehicle for detecting running distance, and more particularly, to such a navigator capable of adequate compensation in detecting running distance so as to secure the exact figures thereof.

BACKGROUND OF THE INVENTION

The conventional navigator aboard a vehicle includes a first means for detecting running distance, and a second means for detecting the direction of motion of the vehicle. With the data obtained by these detecting means the coordinates of the position of the vehicle is calculated so as to indicate it on a display. To detect the running distance, detecting means detects a number of pulses generated in proportion to the rotation of the tires of the vehicle. The running distance is obtained by multiplying the number of pulses by a constant.

However, the diameters of the tires are not constant throughout the running distance due to changes in pneumatic pressure therein and/or in atmospheric temperatures, and the detection of the running distance is likely to contain errors caused by such changes in the diameters of the tires. In addition, errors are also likely to occur due to road conditions varying according to express ways, hilly roads, flat roads, and roads on rainy or snowy days. For these reasons detection of the running distance often leads to erroneous calculation of the position of the vehicle.

OBJECTS AND SUMMARY OF THE INVENTION

The present invention is directed to solve the problems pointed out above with respect to the conventional method of detecting the running distance of the vehicle, and has for its object to provide an improved navigator capable of adequate compensation of the figures obtained through the detection so as to secure an exact recognition of the running distance and the position of the vehicle.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a navigator for use aboard a vehicle, the navigator comprising:

a first means for detecting the running distance of the vehicle;

a second means for detecting the angle of the advancing direction of the vehicle against terrestrial magnetism;

an arithmetic operational means for performing an arithmetic calculation of the coordinates of the position of the vehicle, on the basis of the outputs from the first and second detecting means and a compensation coefficient;

a memory for storing the data on the coordinates of the points of correction set at junctions of roads on the map, the distances between the points of correction, and the declines of roads branching from the points of correction against the terrestrial magnetism;

a p.c. neighborhood locating means for judging whether the vehicle is within a predetermined neighborhood area including the point of correction or not, by referring to the coordinates of the position of the vehicle from the arithmetic operational means and the coordinates of the point of correction from the memory;

a means for judging that the vehicle has made a turn in a first and a second area, respectively, when the position of the vehicle is judged to be within the respective area and the advancing direction of the vehicle is changed by comparing the respective changed advancing direction and the direction of the branching road stored in the memory, and specifying the points of correction in these areas as a first and a second reference points of correction; and a second arithmetic operational means for performing the arithmetic operation of the ratio of that reference distance between the first and second reference points of correction which is obtained from the memory to that measured distance between the first and second reference points of correction which is obtained from the distance detecting means, thereby obtaining the compensation coefficient.

BRIEF DESCRIPTION OF THE DRAWINGS

FIGS. 2 and 3 are tables showing the contents stored in the memory;

DETAILED DESCRIPTION OF THE PREFERRED EMBODIMENTS

Figure 1:
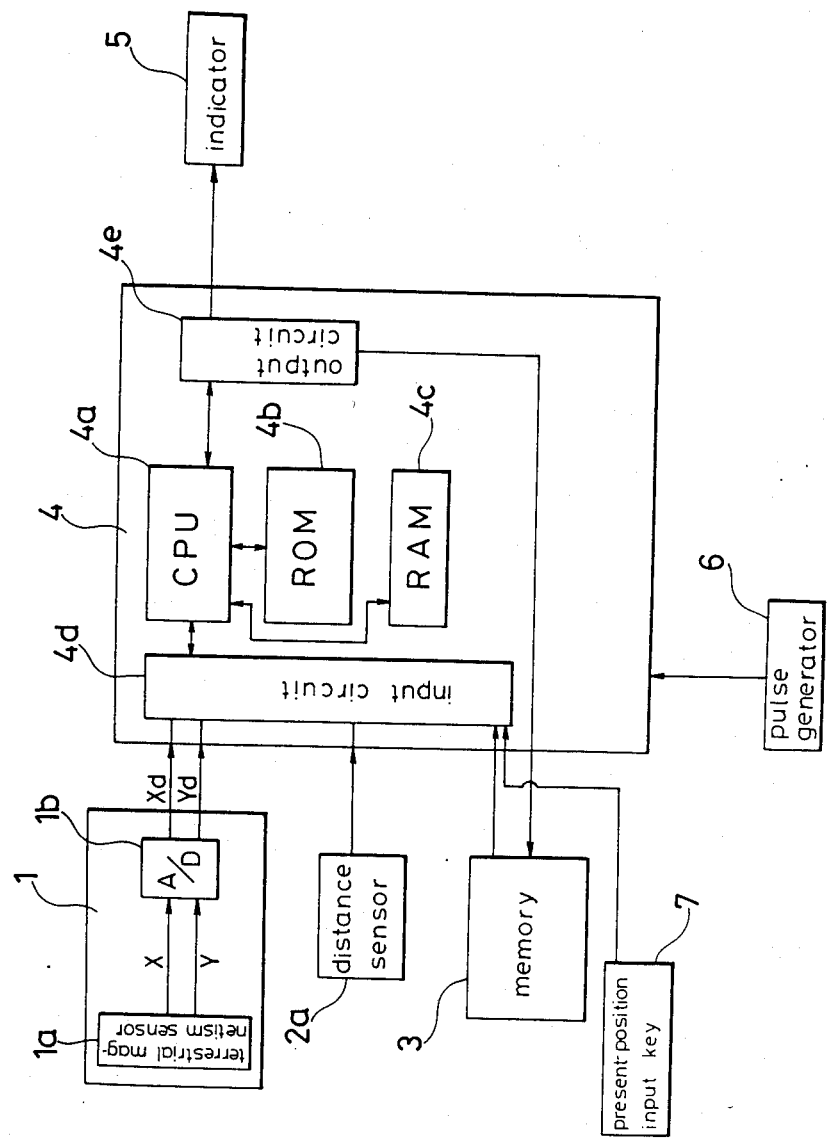
FIG. 1 is a block diagram schematically showing a navigator as one embodiment of the present invention.

Referring to FIG. 1, there is provided a direction detecting means 1 which includes a sensor 1a for detecting an X component and a Y component of the terrestrial magnetism, and an A/D converter 1b adapted to digitize the signals from the sensor 1a, thereby generating digital signals Xd and Yd as the X and Y components of the terrestrial magnetism, wherein the X and Y axis are taken with reference to the direction of motion of the vehicle. There is provided a distance sensor 2a as a distance detecting means adapted to detect the running distance, which generates pulses in accordance with the rotation of a tire; for example, one pulse per Q cm.

The reference numeral 3 designates a memory (ROM) for storing data such as the coordinates of points of correction, the distances between points of correction, and the directions of roads branching from the points of correction. The reference numeral 4 designates a microcomputer which includes a CPU 4a, a ROM 4b, a RAM 4c, an input circuit 4d, and an output circuit 4e. The microcomputer 4 executes the programs which are previously programmed and stored in the ROM 4b.

There is provided an indicator 5 for indicating the present position of the vehicle. The reference numeral 6 designates a pulse generator for emitting interrupt pulses at each predetermined time t, and the reference numeral 7 designates a key for inputting the X-Y coordinates of the present position of the vehicle.

Figure 4:
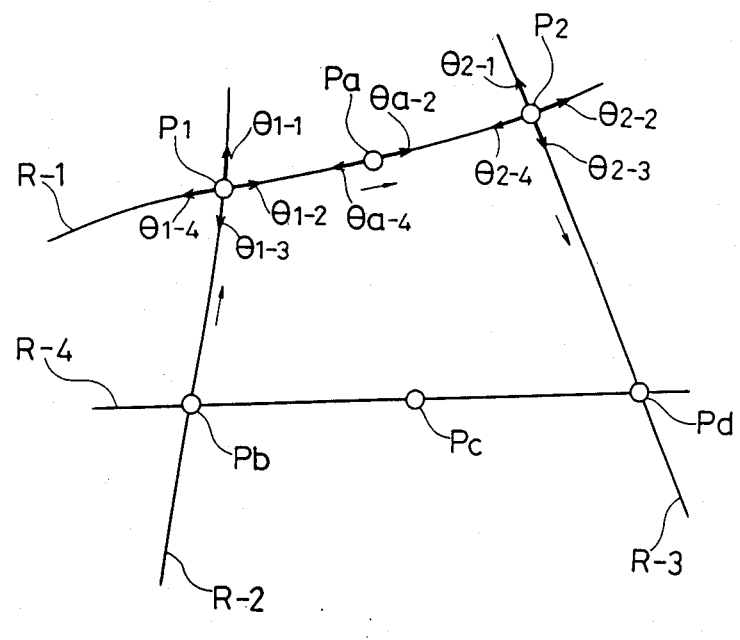
FIG. 4 is a diagrammatic view showing an example of the patterns of roads on a map.

Referring to FIGS. 2 and 3, the contents stored in the memory 3 will be described:

FIGS. 2 and 3 respectively show patterns 41 and 42 each representing the contents of the memory 3 with respect to the road illustrated in FIG. 4, which shows information about the coordinate data on the points of correction $P_1$, Pa, $P_2$, Pb, Pc, and Pd established on the illustrated road, the distances between adjacent points of correction, and directions of the roads branching from each point of correction. In one section of the memory 3 the pattern 41 in FIG. 2 is stored, and in the other section thereof the pattern 42 in FIG. 3 is stored.

In FIG. 4 the reference characters R-1, R-2, R-3, and R-4 show route numbers. Likewise, $\theta 1\text{-}1$, $\theta 1\text{-}2$, $\theta 1\text{-}3$ and $\theta 1\text{-}4$ at the point $P_1$, $\theta\text{-}a\text{-}4$, $\theta a\text{-}2$ at the point Pa and $\theta 2\text{-}1$, $\theta 2\text{-}2$, $\theta 2\text{-}3$ and $\theta 2\text{-}4$ at the point $P_2$ show the respective directions of the roads branching from the points $P_1$, Pa and $P_2$. The points $P_1$, Pa, $P_2$, ... on the route R-1 which appear in that order from the left in FIG. 4 are arranged successively in FIGS. 2 and 3, and the points Pb, P1, ... on the route R-2 from below in FIG. 4 are arranged likewise in FIGS. 2 and 3. The points Pd, $P_2$, ... on the route R-3 from below in FIG. 4, and the points Pb, Pc, Pd, ... on the route R-4 from the left in FIG. 4 are arranged likewise in FIGS. 2 and 3.

The information about each point of correction is stored in the memory 3 as shown in FIG. 2; that is, in the column for the route numbers the route number R-1, R-2; R-3, ... are successively written in; in the column for the set points of correction on the route concerned the points are written in the order specified from the left or below in FIG. 4; in the column for the coordinates data the coordinates of each point of correction are written in. In the column for distance data $S_1a$ shows a distance between $P_1$ and Pa. Likewise, $Sa_2$, $Sb_1$, and $Sd_2$ respectively show the distances between Pa and $P_2$, between Pb and $P_1$, and between Pd and $P_2$. In the column for the distance data (Mode $M_1$) a particular data, such as $S_1a$, in a particular row, such as for Pa, represents the distance between Pa and the point of correction one row above, that is, $P_1$. In the column for another distance data (Mode $M_2$) a particular data, such as $Sa_2$, in a particular row, such as for Pa, represents the distance between Pa and the point of correction one row below, that is, $P_2$.

In FIG. 3 the identification of the set point, such as $P_1$, the coordinates, such as $(x_1, y_1)$, and the branching information at this point, are shown for each point of correction. The branching information shows the direction (e.g. $\theta_{1\text{-}1}$) for the point $P_1$ on the branching road 1, the route number (e.g. R-2) to which the branching road 1' belongs, and the distance data (Mode $M_1$) to be read out when the vehicle turns into the branching road 1. With respect to the branching roads 2 to 4 the directions, the route numbers, and the distance data for each mode are likewise recorded.

Figure 5:
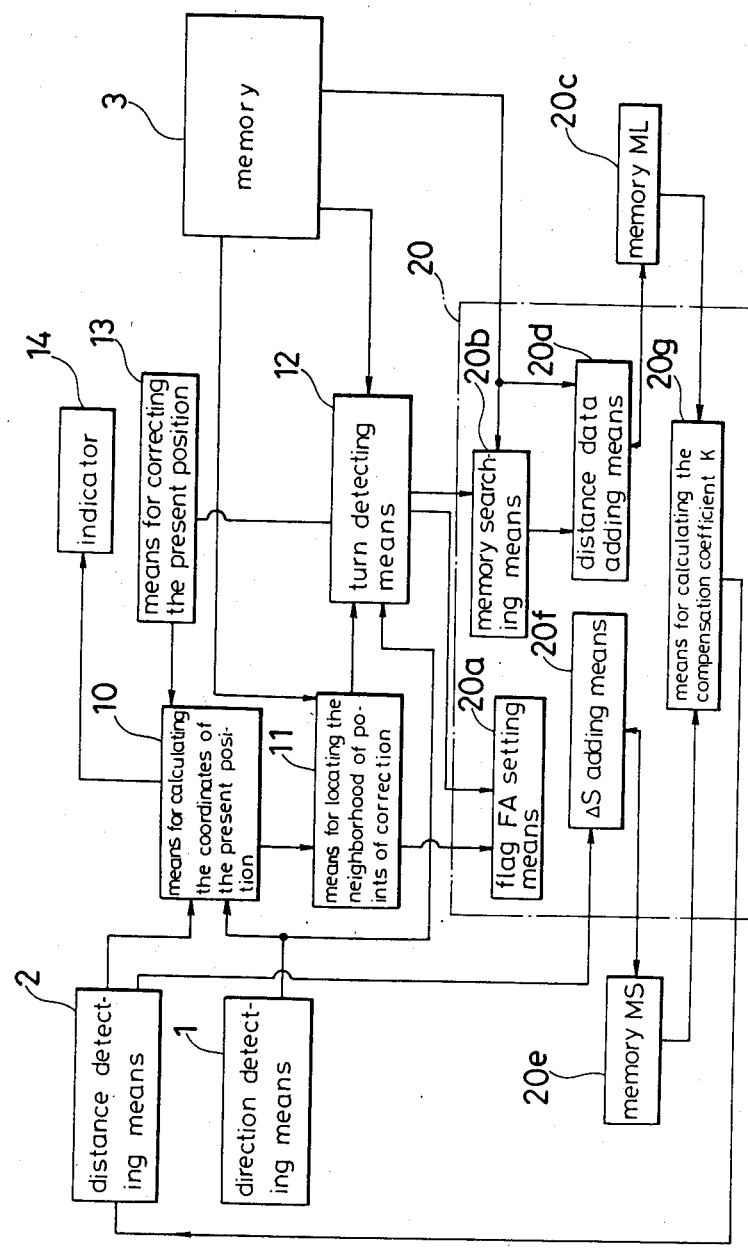
FIG. 5 is a block diagram showing the detailed construction of the navigator of FIG. 1.

Referring to FIG. 5 one embodiment of the whole construction of the present invention will be described:

The reference numeral 1 designates a direction detecting means, which has a terrestrial magnetism sensor 1a and an A/D converter 1b as shown in FIG. 1. This detecting means 1 detects digital signals Xd and Yd at a predetermined interval of time $\Delta T$. The advancing direction $\theta$ of the vehicle is calculated by the following equation (1):

$$\theta = \tan^{-1} \frac{Yd}{Xd} \quad (1)$$

The reference numeral 2 designates a distance detecting means, which has a distance sensor 2a as also shown in FIG. 1. This distance detecting means 2 generates pulses in accordance with the rotations of the tires of the vehicle, wherein the number of pulses is represented by N. On the basis of the number of pulses $\Delta N$ the running distance $\Delta S$ of the vehicle per $\Delta T$ is operated in accordance with the following equation (2):

$$\Delta S = \Delta N \cdot Q \cdot K \quad (2)$$

where,
$\Delta N$: the number of pulses generated for a predetermined period of time $\Delta T$;
Q: a constant; and
K: a compensation coefficient.

If no compensation is required, the K is 1.0, and the value of K is determined by a calculating means 20g shown in FIG. 5.

The reference numeral 10 designates a coordinate calculating means for calculating the coordinates of the present position, which arithmetically calculates the coordinates (X, Y) of the present position from the outputs of the direction detecting means 1 and the distance detecting means 2. Hereinafter, this calculating means 10 will be referred to merely as the calculator 10. This calculator 10 calculates incremental changes $\Delta X$ and $\Delta Y$ on the X- and Y-axis for a period of time $\Delta T$ with the use of the following equations (3) and (4), wherein changes occur in the present position X, Y of the vehicle previously input by the key 7 shown in FIG. 1:

$$\Delta X = \frac{Xd}{\sqrt{Xd^2 + Yd^2}} \cdot \Delta S \quad (3)$$

$$\Delta Y = \frac{Yd}{\sqrt{Xd^2 + Yd^2}} \cdot \Delta S \quad (4)$$

The new values of X and Y having these values calculated by the equations (3) and (4) added to the former X and Y represent the coordinates of the present position.

In other words, the calculator 10 seeks the coordinates of the present position by conducting an arithmetic operation according to the equations (5) and (6) in response to the output signals from the direction detecting means 1 and the distance detecting means 2.

$$X \leftarrow X + \Delta S \cdot \frac{Xd}{\sqrt{Xd^2 + Yd^2}} \quad (5)$$

$$Y \leftarrow Y + \Delta S \cdot \frac{Yd}{\sqrt{Xd^2 + Yd^2}} \quad (6)$$

The reference numeral 11 designates a means for locating the neighborhood of a point of correction, which is designed to read out the coordinates (x, y) of the points of correction in the pattern 42 of FIG. 3 recorded in the memory 3, and to arithmetically locate or discover the coordinates (x, y) which satisfy the following equations (7) and (8) against the coordinates (X, Y);

$$|x - X| \leq W_1 \qquad (7)$$

$$|y - Y| \leq W_2 \qquad (8)$$

where $W_1$ and $W_2$ are previously determined values; for example, $W_1 = 20$ m and $W_2 = 15$ m.

The reference numeral 12 designates a means for judging that the vehicle has made a turn, which is designed to read out a direction $\theta k$ from the direction detecting means 1 at the moment the vehicle enters the area satisfying the equations (7) and (8) against the coordinates (x, y) located by the locating means 11. The turn detecting means 12 further continues to read out a direction $\theta m$ from the direction detecting means 1 while the vehicle is running in the area, and judges whether the two directions read out satisfy the equation (9) or not. When the two values satisfy equation (9), it is judged that the vehicle has made a turn:

$$|\theta k - \theta m| > \frac{\pi}{6} \qquad (9)$$

$\pi/6$ is a predetermined value, and it is supposed that the roads branching from each point of correction cross each other at an angle not smaller than $\pi/6$, and that the vehicle is always on the road.

The reference numeral 20 designates a block which conducts the arithmetic calculation of the compensation coefficient K. The reference numeral 20a designates a flag setting means adapted to control the flow of the program of FIG. 8 hereinafter referred to. The flag FA is located in a section of RAM 4c within microcomputer 4 as shown in FIG. 1.

The reference numeral 20b designates a memory searching means, which searches a first point of correction, such as $P_1(x_1, y_1)$, from which it is judged that the present position of the vehicle is within the predetermined neighborhood area and that the vehicle has made a turn, selects a direction such as $\theta 1\text{-}2$, which is closest to the particular direction $\theta m$ obtained by the turn detecting means 12 among the direction data $\theta 1\text{-}1$ to $\theta 1\text{-}4$ of the branching roads 1 to 4 arranged in the same row, and extracts a route number R-1 and a distance data (Mode $M_1$) belonging to the branching road number 2, and selects a row from FIG. 2 which row has the data of the coordinates of the first point of correction $P_1(x_1, y_1)$ and the route number R-1.

There is provided a distance data adding means 20d, which is adapted to add a distance data of mode $M_1$ or $M_2$ in FIG. 2 to the content of a memory ML section 20c of the RAM 4c in FIG. 1. More specifically, when a turn is made in the neighborhood of the next point of correction on the same route, the means 20d adds a distance data of the selected mode to the content of the memory section 20c. In addition, when the vehicle has passed through the predetermined neighborhood area of the next point of correction without making any turn in the area on the same route, the means 20d adds a distance data of the selected mode to the content of the memory section 20c at each passing of the area. When the mode selected by the memory searching means 20b is $M_1$, the point of correction is advanced to the one located one row below in accordance with the advance of the vehicle on the same route shown in FIG. 2, and the means 20d selects the distance of mode $M_1$ to add it to the running distance. When the selected mode is $M_2$, the point of correction is advanced to the one located one row above in accordance with the advance of the vehicle on the same route shown in FIG. 2, and the means 20d selects the distance of mode $M_2$ to add it to the running distance.

The reference numeral 20f designates a $\Delta S$ adding means which adds $\Delta S$ at a predetermined time interval T to the content of the memory MS section 20e located in a section of the RAM 4c shown in FIG. 1, wherein $\Delta S$ is sent from the distance detecting means 2. The $\Delta S$ adding means 20f clears the content of the memory section 20e at the first point of correction where it is judged by the locating means 11 and the turn detecting means 12 that the present position is in the neighborhood of a point of correction and the vehicle has made a turn, and adds $\Delta S$ at each time interval $\Delta T$ after that moment.

The reference numeral 20g designates a means for calculating the compensation coefficient, which is adapted to operate a ratio of the content ML of the memory section 20c to the content MS of the memory section 20e at the moment when it is judged that the vehicle has made a second turn in the neighborhood of the second point of correction $P_2$ after beginning from the first point of correction $P_1$. The compensation coefficient K is represented by the following equation (10):

$$K = \frac{ML}{MS} \qquad (10)$$

The reference numeral 13 designates a means for correcting the coordinates (X, Y) of the present position from the calculator 10 to that of the point of correction when it is judged that the vehicle has made a turn in the neighborhood of the point of correction. The reference numeral 14 designates a means for indicating the coordinates of the present position operated by the calculator 10 on an indicator 5 shown in FIG. 1.

Figure 6:
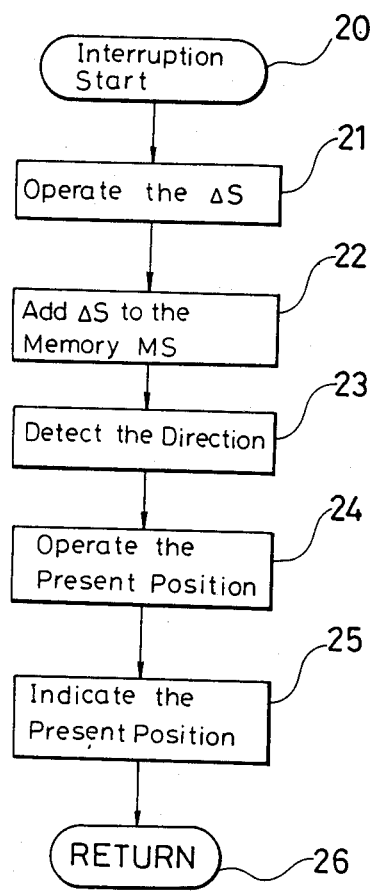
FIG. 6 is a flow chart of the interruption processing.
Figure 7:
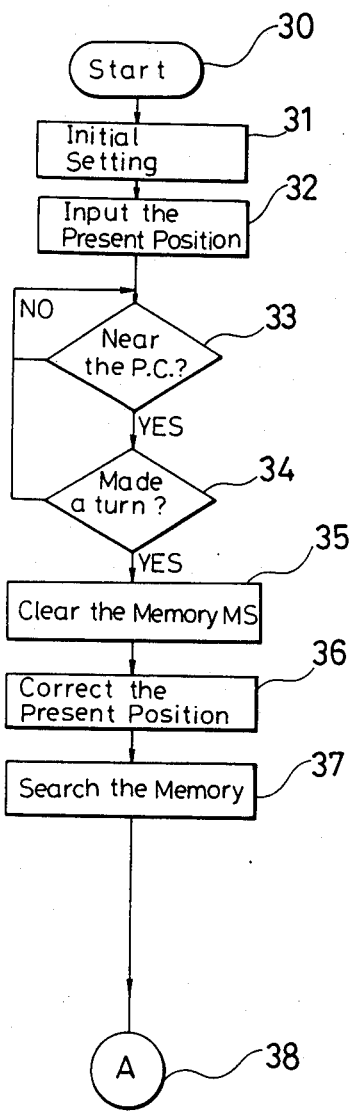
FIGS. 7 and 8 are flow charts of the sequence of operations of the navigator shown in FIG. 5.
Figure 8:
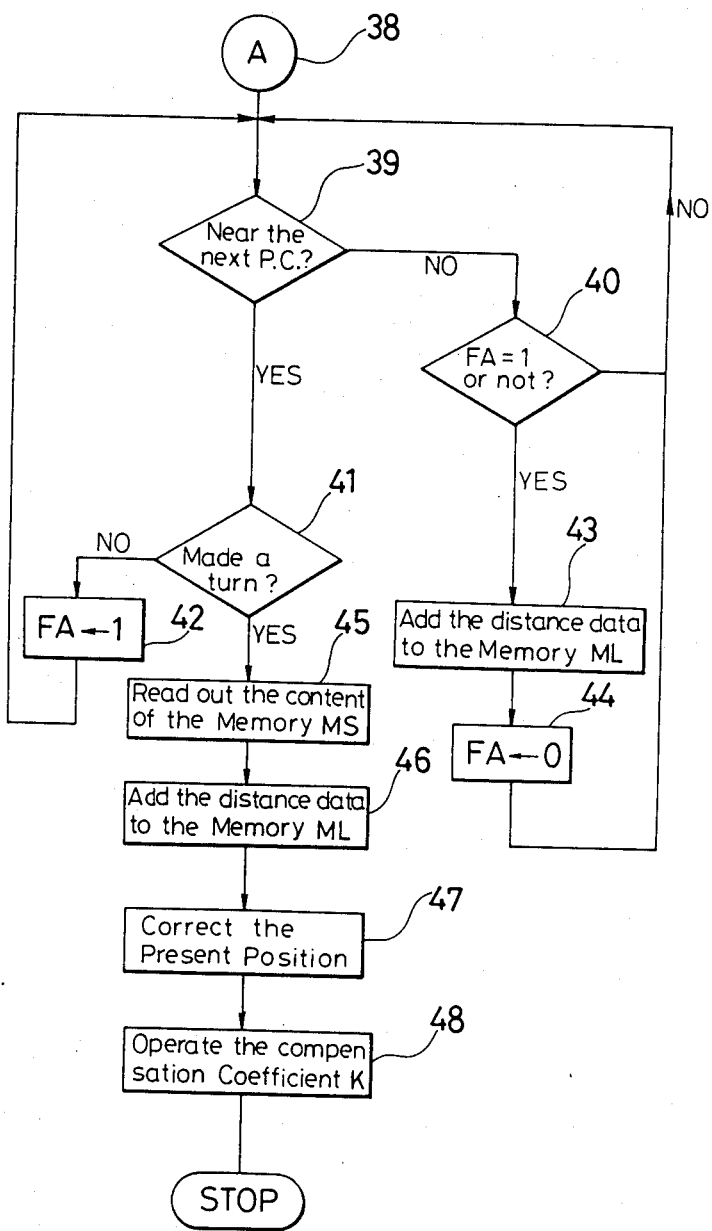

An example of the operation will be described with reference to FIGS. 6 to 8:

FIGS. 6 to 8 are flow charts showing the sequence of operation of the navigator stored in the ROM 4b of the microcomputer 4.

The following description is based on the presumption that the vehicle makes a turn in the $\theta 1\text{-}2$ direction of the route No. R-1 in the neighborhood of the point $P_1$ on the route No. R-2, passes through the point Pa, and makes a turn in the $\theta 2\text{-}3$ direction on the route No. R-3 in the neighborhood of the point $P_2$.

In FIG. 7 the operation starts at a step 30, and at an initial setting step 31 the contents of the memory sections 20e and 20c, and the flag 20a are all cleared, and the compensation coefficient K is set to "1" (for no compensation). The compensation coefficient K is stored in a section (referred to as MK) of the RAM 4c in FIG. 1.

Subsequently, at a step 32 the coordinates of the present position (X, Y) are input by the key 7 (FIG. 1) as the neighborhood of $P_1$ on the route R-2. In FIG. 6, a step 20 is started at each time interval T generated by the pulse generator 6 (FIG. 1). In a step 21 of arithmetically calculating the $\Delta S$ by the distance detecting means, the content K of the memory MK is read out against the rotations of the tires $\Delta N$ at each time interval $\Delta T$ to calculate $\Delta S = \Delta N \cdot Q \cdot K$. At a step 22 the sum of $\Delta S$ and the content of the memory MS is made the content of the memory MS, whereby the running distance is detected.

In a step 23 of detecting the direction, the Xd and Yd components of terrestrial magnetism on the X- and Y-axis with reference to the advancing direction of the vehicle are detected at each time interval $\Delta T$, and the advancing direction $\theta$ is calculated by the equation (11):

$$\theta = \tan^{-1} \frac{Yd}{Xd} \tag{11}$$

In a step 24 of arithmetically calculating the present position, the operation of the equations (5) and (6) is carried out at each time interval $\Delta T$ so as to obtain the coordinates of the present position (X, Y).

In a step 25 of indicating the present position by the indicator 14, the coordinates obtained at the step 24 are indicated on the indicator 5. At a step 26 the sequence is returned to the main program.

In FIG. 7 the step 33 corresponds to the operation of the means for locating the neighborhood of the points of correction 11, and the step 34 corresponds to the operation of the turn detecting means 12, and by these two steps it is judged whether the present position is in the neighborhood of a point of correction and the vehicle has made a turn therein, and then, at a step 35 the memory MS section 20e is cleared. From this moment $\Delta S$ is added to the memory MS section 20e at each time interval $\Delta T$ by the step 22 of FIG. 6, thereby enabling the running distance after the vehicle has made a turn at the point of correction to be recorded. In FIG. 4, if it is assumed that the vehicle made a turn at the point $P_1$ toward the point Pa, the point $P_1$ will be made a first reference point of correction, and the running distance S therefrom will be recorded in the memory MS section 20e. At the same time at the step 36 the present position (X, Y) is corrected to the coordinates of the point of correction $P_1$, from which the arithmetic operation of the step 24 is advanced.

The step 37 corresponds to the operation of the memory searching means 20b in FIG. 5. On the presumption that the vehicle has made a turn in the $\theta 1$-$2$ direction at the point of correction $P_1$ $(x_1, y_1)$ in FIG. 4, at the step 37 the route No. R-1 and the distance data (Mode $M_1$) are selected from the data of branch 2 including $\theta 1$-$2$ in the row of $P_1$ $(x_1, y_1)$ in FIG. 3. Then, the row having coordinate data $(x_1, y_1)$ and route No. R-1 is searched in FIG. 2, and on the basis of the searched row and the distance data (Mode $M_1$) it is recognized that, thereafter, the vehicle advances toward the point Pa in the row below in FIG. 2. After the step 37 in FIG. 7 the program advances to the step 39 through the step 38 in FIG. 8.

In a step 39 (FIG. 8) it is judged by the neighborhood locating means 11 whether the present position is in the neighborhood of the point of correction Pa, on the basis of a comparison of the coordinates of the next point of correction (xa, ya) obtained at the step 37, and the coordinates of the present position which was calculated at the step 24. When the present position is in the neighborhood of the point of correction Pa, the program advances to a step 41, and it is judged whether the vehicle has made a turn by the turn detecting means 12. When no turn is made in the neighborhood of the point of correction, the flag FA is set to "1" in the flag FA setting means 20a (FIG. 5) at a step 42. When the vehicle advances from $P_1$ and enters into the neighborhood of Pa, and leaves it without having made any turn, the program advances from the step 40 to step 43.

At the step 43 the distance data in the row including Pa is read out from the mode which was searched at the step 37, and the resulting value $S_{1a}$ is added to the memory ML section 20c by the distance data adding means 20d. In this way when the vehicle leaves the point Pa, the distance data $S_{1a}$ between $P_1$ and Pa is stored in the memory ML section 20c.

At step 44 the flag FA is set to "0", and it is judged at the steps 39 and 41 whether the vehicle has come into the neighborhood of the next point of correction $P_2$. When the vehicle goes from $P_1$ to Pa, and further advances into the neighbourhood of $P_2$, the flag FA is again set to "1" at the steps 39 and 41. When the vehicle makes no turn in the neighborhood of $P_2$ and goes far therefrom, the program advances to the steps 40 and 43 to conduct the same sequence again.

When the vehicle makes a turn in the predetermined neighborhood area of $P_2$, this point $P_2$ is made the second reference point of correction, and at a step 45 the content (MS) of the memory MS section 20e is read out. The content of the memory MS section 20e includes the data which was obtained by the arithmetic calculation of the total distance S between the first and second reference points $P_1$ and $P_2$ over which the vehicle has traveled from the turning point in the neighborhood of $P_1$ up to the next turning point in the neighborhood of $P_2$ via Pa. At a step 46 the distance data $S_{a2}$ of the mode $M_1$ at $P_2$ in the same route number is added to the content of the memory ML section 20c, whereby the content of the memory ML section 20c is updated. In this way $(S_{1a} + S_{a2})$ has been inputted to the memory ML section 20c for storage.

The $S_{1a}$ and $S_{a2}$ are originally a data which consists of exact figures stored in the memory 3, and the sum $(S_{1a} + S_{a2})$ is equally accepted as an exact data. In contrast, the content of the memory MS section 20e consists of the data which was obtained by arithmetic calculation of $\Delta S$ using the rotations of the tires $\Delta N$, thereby to calculate the total distance S. As pointed out above, these figures are likely to contain errors due to the varying pneumatic pressures in the tires, and road and climatic conditions.

At a step 47 the coordinates of the present position (X, Y) are corrected to that of $P_2$. Subsequently, at a step 48 the compensation coefficient K is calculated by the equation: $K = ML/MS$, and the results are stored in the memory section MK of the RAM 4c. After the vehicle has passed $P_2$, S is arithmetically calculated by putting the compensation coefficient K in the equation (12) at the step 21:

$$\Delta S = \Delta N \cdot Q \cdot K = \Delta N \cdot Q \cdot \frac{ML}{MS} \tag{12}$$

When the vehicle travels over a distance between $P_1$ and $P_2$ with the value of $K = ML/MS$ for the compensation coefficient, the running distance S will be expressed by the equation (13), and an error-free distance value ML is obtained in terms of the distance S:

$$S = \Sigma \Delta S = \Sigma \Delta N \cdot Q \cdot \frac{ML}{MS} \tag{13}$$

$$= \frac{ML}{MS} \times [\Sigma \Delta N \cdot Q] = ML$$

In the illustrated embodiment $\Delta S$ is calculated with the use of the compensation coefficient K which was obtained on the basis of the distance between the two points of correction where the vehicle made turns. As a result, even if $\Delta S$ contains an error resulting from the distance detecting means, the detected distance is subjected to compensation, thereby securing an exact value of $\Delta S$.

A modified version of the turn detecting means 12 will be described:

In the turn detecting means 12 shown in FIG. 5, when the vehicle enters the predetermined area in the neighborhood of the point of correction, the direction $\theta k$ from the direction detecting means 1 is read out, and each direction $\theta$ of the branching roads which are stored in the memory 3 for this point of correction are selected from FIG. 3, so as to seek a direction which satisfies the following inequality:

$$|\theta k - \theta| < \frac{\pi}{10}$$

where $\pi/10$ is a predetermined value. Herein, it is presumed that $\theta 1\text{-}3$ at the point $P_1$ is selected.

When the vehicle advances, the direction $\theta p$ from the direction detecting means 1 is read out continuously, and the same procedure as mentioned above is adapted to seek a direction $\theta s$ among the directions $\theta 1\text{-}1$ to $\theta 1\text{-}4$ in the row of $P_1$ in FIG. 3 which satisfies the following inequality.

$$|\theta p - \theta s| < \frac{\pi}{10}$$

Herein, it is presumed that $\theta 1\text{-}2$ at the point $P_1$ is selected. If the selected value $\theta p$ (in the example, $\theta 1\text{-}3$) and $\theta s$ (in the example, $\theta 1\text{-}2$) are different from each other, it can be judged that the vehicle has made a turn in the course.

A modified version of the distance detecting means 2 can be obtained by varying the value of $\Delta T$ in the course of operation on the basis of the following:

In the pulse generator 6 shown in FIG. 1, if any change occurs in $\Delta T$ during the operation, the interruption processing at each time interval of $\Delta T$ makes the $\Delta N$ in the operation of the step 21 (FIG. 6) the number of pulses for the period of time $\Delta T$, thereby giving no influence on the calculation of $\Delta S$.

A modified version of the means for locating the neighborhood of the point of correction 11 will be described:

In the neighborhood locating means 11 and the turn detecting means 12 of the above-illustrated embodiment, the coordinates (X, Y) which satisfy the following formulae against the coordinates of the point of correction (x, y) are sought to define the neighborhood area of the point of correction (x, y).

$$|x - X| \leq W_1$$

$$|y - Y| \leq W_2$$

However, this neighborhood area may be an area which is obtained by making $W_1$ and $W_2$ variable values so as to set them optionally for each point of correction or each branching road. In addition, the neighborhood area may be a circle or an ellipse which satisfy the following formulae (14) and (15):

$$[X - (x + \alpha)]^2 + [Y - (y + \beta)]^2 \leq W_3^2 \tag{14}$$

$$\frac{[X - (x + \alpha)]^2}{W_4^2} + \frac{[Y - (y + \beta)]^2}{W_5^2} \leq 1 \tag{15}$$

where $\alpha$, $\beta$, $W_3$, $W_4$ and $W_5$ are variable. Furthermore, the area may be a rectangle which satisfy the following formulae (16) and (17):

$$|(x + \alpha) - X| \leq W_1 \tag{16}$$

$$|(y + \beta) - Y| \leq W_2 \tag{17}$$

In short, the area may be of various configurations including the points of correction, and it is not necessary to fix the size and shape of the area.

According to the present invention, the following advantages are achieved:

When the vehicle makes a turn in an area including a point of correction, the point of correction is made a reference point of correction. The ratio of the distance between the two reference points of correction on the map to the distance actually detected is made the compensation coefficient, and with the use of this coefficient the running distance and the present particular position are arithmetically calculated, thereby securing the exact location of the position of the vehicle.

What is claimed is:

1. A navigator for use aboard a vehicle, comprising:
 first means for detecting the running distance of the vehicle and producing an output signal corresponding thereto;
 second means for detecting an angle of the advancing direction of the vehicle relative to terrestrial magnetism and producing an output signal corresponding thereto;
 arithmetic operational means for performing an arithmetic calculation of the coordinates of the position of the vehicle in response to said output signals from said first and second detecting means and a compensation coefficient;
 memory means for storing data on the coordinates of points of correction set at intersections of roads on a map of the area in which the vehicle is traveling, the distances between said points of correction, and the angles of roads branching from the points of correction relative to terrestrial magnetism;
 locating means for judging whether the vehicle is within a predetermined distance from a point of correction by comparing the coordinates of the position of the vehicle from the arithmetic operational means with the coordinates of said points of correction stored in said memory means;
 means for judging whether the vehicle has made a turn in a first area, when the position of the vehicle is judged to be within the first area by comparing the advancing direction of the vehicle with directions of the branching roads stored in said memory means, and specifying the point of correction in said first area as a first reference point of correction and a point of correction in a second area in the advancing direction of the vehicle as a second reference point of correction; and second arithmetic operational means for performing an arithmetic calculation of the ratio of the distance between the first and second reference points of correction obtained from the memory means to the distance between the first and second reference points of correction obtained from said first detecting means, to obtain said compensation coefficient.

2. A navigator as defined in claim 1, wherein said running distance detecting means detects the running distance of the vehicle at predetermined time intervals or at irregular time intervals, and incrementally adds the distances so detected to obtain the running distance.

3. A navigator for use aboard a vehicle, comprising:
first means for detecting the advancing direction of the vehicle including,
   a terrestrial magnetism sensor, an A/D converter, and
   means for detecting the X- and Y-components of the terrestrial magnetism as digital signals Xd and Yd at predetermined time intervals so as to obtain the advancing direction $\theta$ of the vehicle;

second means for detecting the running distance of the vehicle S, by multiplying a number of pulses N generated in accordance with the distance travelled by the vehicle for a predetermined period of time T by a constant Q and a compensation coefficient K to obtain the running distance S for the time T, arithmetic operational means for performing an arithmetic calculation to obtain the coordinates of the position of the vehicle by calculating incremental changes X and Y in the X- and Y-axis direction for a predetermined time interval T in response to the digital signals Xd and Yd from the first means, and the value of S from the second means, and adding the changes X and Y to the coordinates of the present position;

memory means for storing data on the coordinates of points of correction set at intersections of roads on a map of the area in which the vehicle is travelling, the distances between said points of correction, and the angles of roads branching from the points of correction relative to terrestrial magnetism;

locating means for locating the point of correction whose coordinates are within a predetermined distance from the present position, the locating means reading out the coordinates of the points of correction from the memory means, and receiving the coordinates of the present position (X, Y) from the arithmetic operational means, thereby comparing the aimed coordinates of the points of correction against those of the present position;

turn detecting means for judging whether the vehicle has made a turn and outputting a turn judging signal corresponding thereto, said turn detecting means receiving the angle $\theta m$ stored in the memory means corresponding to the coordinates of the point of correction searched by the locating means, receiving the advancing direction $\theta$ from said first means, and judging that the vehicle has made a turn when the advancing direction $\theta$ is within a predetermined direction range with respect to the angle $\theta m$; and second arithmetic operational means for obtaining said compensation coefficient K by calculating the ratio of a reference distance between the point of correction for the present turn judging signal and that for the immediately preceding turn judging signal, the reference distance being stored in the memory means, to the measured distance between the point of correction for the present turn judging signal and the point of correction for the immediately preceding turn judging signal, on the basis of the running distance S from the distance detecting means, as said compensation coefficient K.

4. A navigator as defined in claim 3, wherein the second arithmetic operational means comprises:
a first memory for storing a reference distance between the point of correction for the present turn judging signal and the point of correction for the immediately preceding turn judging signal calculated on the basis of the distance between the points of correction stored in the memory means;

a second memory for storing a measured distance from the point of correction for the immediately preceding turn judging signal to the point at which the present turn judging signal from the turn detecting means is outputted;

means for adding the running distance S to said measured distance stored in the second memory upon receipt of the running distance S from the distance detecting means, thereby updating the measured distance in the second memory; and compensation coefficient arithmetic operational means for arithmetically calculating the ratio of the measured distance stored in the second memory upon outputting of the turn judging signal to the reference distance stored in the first memory to output said compensation coefficient K.

* * * * *